US008266569B2

(12) United States Patent
Palisetti et al.

(10) Patent No.: US 8,266,569 B2
(45) Date of Patent: Sep. 11, 2012

(54) IDENTIFICATION OF CRITICAL ENABLES USING MEA AND WAA METRICS

(75) Inventors: Vasant Palisetti, Santa Clara, CA (US); Rachida Kebichi, Lexington, MA (US); Samuel Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 335 days.

(21) Appl. No.: 12/718,594

(22) Filed: Mar. 5, 2010

(65) Prior Publication Data
US 2011/0218779 A1 Sep. 8, 2011

(51) Int. Cl.
*G06F 17/50* (2006.01)
(52) U.S. Cl. ............. 716/133; 716/109; 716/132; 703/2
(58) Field of Classification Search .................. 716/109, 716/132, 133; 703/2
See application file for complete search history.

(56) References Cited

U.S. PATENT DOCUMENTS

| | | | |
|---|---|---|---|
| 5,940,779 A * | 8/1999 | Gaitonde et al. ................. | 702/60 |
| 6,345,379 B1 * | 2/2002 | Khouja et al. .................. | 716/115 |
| 6,480,815 B1 * | 11/2002 | Olson et al. ..................... | 703/14 |
| 6,529,861 B1 * | 3/2003 | Patra et al. ...................... | 703/14 |
| 6,556,962 B1 * | 4/2003 | Patra ............................... | 703/14 |
| 6,636,976 B1 * | 10/2003 | Grochowski et al. ......... | 713/320 |
| 7,323,909 B2 | 1/2008 | Mamidipaka | |
| 7,607,115 B1 | 10/2009 | Krishnaswamy et al. | |
| 7,610,571 B2 | 10/2009 | Chen | |
| 7,870,521 B2 * | 1/2011 | Palisetti ......................... | 716/136 |
| 8,108,194 B2 * | 1/2012 | Zhu et al. ........................ | 703/14 |
| 2003/0208747 A1 | 11/2003 | Kim et al. | |
| 2007/0234266 A1 * | 10/2007 | Chen et al. ....................... | 716/13 |
| 2008/0180159 A1 | 7/2008 | Campbell et al. | |
| 2009/0031268 A1 * | 1/2009 | Miranda et al. .................. | 716/6 |
| 2009/0158076 A1 | 6/2009 | Chejara | |
| 2009/0217068 A1 | 8/2009 | Fernsler, Jr. et al. | |
| 2009/0217220 A1 | 8/2009 | Palisetti | |
| 2009/0271167 A1 | 10/2009 | Zhu | |
| 2009/0293028 A1 | 11/2009 | Hiraoglu et al. | |
| 2009/0327980 A1 | 12/2009 | Melamed-Kohen et al. | |

OTHER PUBLICATIONS

AMD Geode CS5536 Companion Device Data Book, May 2007.
AMD Power Design Needs, Oct. 5, 2006.
CALYPTO, PowerPro CG, printed Jan. 6, 2010.
APACHE Design Solutions, PowerArtist-XP, Analysis-driven Automatic RTL Power Reduction, 2009.
Synopsys, Expanding the Synopsys Prime Time Solution with Power Analysis, Jun. 2006.
PwrLite, Enabling Design for Low Power, 2007.
EDA Design Line, Utilizing Clock-Gating Efficiency to Reduce Power, Jan. 15, 2008.
CALYPTO PowerPro CG, PowerPro CG automates RTL Power Optimization, 2010.

* cited by examiner

*Primary Examiner* — Naum Levin
(74) *Attorney, Agent, or Firm* — Hamilton & Terrile, LLP; Michael Rocco Cannatti

(57) ABSTRACT

A plurality of sequential nodes in a design file for an electronic device are identified and one or more combinatorial power metric values are computed for the plurality of sequential nodes based upon an effective switching capacitance, a switching activity measure, and a power effort measure for at least a first device downstream from the each sequential node at a specified depth. The combinatorial power metric values for the plurality of sequential node are stored and compared to a target power metric value to determine if power consumption at the electronic device meets a predetermined power performance goal.

14 Claims, 4 Drawing Sheets

IDENTIFICATION OF CRITICAL ENABLES USING MEA AND WAA METRICS

BACKGROUND

1. Field of the Invention

The present invention relates in general to electronic devices. In one aspect, the present invention relates to a method and apparatus for designing electronic devices.

2. Description of the Related Art

Because of the increasing computational intensity (and the associated power consumption by the processor(s)) for electronic devices, it is an important goal in the design of electronic devices to minimize circuit operations and the associated power consumption. It is particularly crucial for electronic devices targeted for low-power applications (e.g., for wireless and portable electronics) in order to extend battery life. Generally speaking, power reduction efforts will seek to reduce the overall power consumption of the device by identifying portions of a design that consume relatively high amounts of power as compared to other portions of the design, and then further optimizing their design or layout characteristics to reduce power consumption in the identified portion(s). In this analysis, the amount of power consumed by a block or portion of a device may be estimated using dynamic or static techniques, though such techniques are often applied late in the design process of a device at significant computational cost. Once a block or portion of the device is identified as a high power consumer, its dynamic power consumption may be optimized by reducing the relevant circuit's power supply voltage, load capacitance, clocking activity, switching activity, etc. An example optimization technique will add sequential clock gating logic at the RTL design level to reduce power consumption by controlling device clocking so that a clock signal in a block or an array is disabled when the internal circuitry from the block/array is not required to perform work for an extended amount of time. Later, when the period of inactivity has ended, the clock signal is enabled again. An enable signal may be routed to a clock-gating circuit in order to perform this power-saving technique. While RTL clock gating is a common optimization technique for improving energy efficiency, it must still be determined how well a design is clock gated. Various design tools are available for computing predetermined efficiency estimation metrics for the inserted gates, such as the percentage of flops gated, the percentage of flops killed, the percentage in reduction of Q toggle (provided in PwrLite's CooolGate tool), and "average percentage of time each register is gated for a given test bench" (provided in Calypto's PowerProCG tool). However, it is computationally cumbersome to track these metrics, and it is also difficult to understand how the different metrics affect each other. For example, using the percentage of registers clock gated as a metric does not indicate the energy efficiency because it does not take into account switching activity. And while an average clock-gating efficiency metric is a better energy consumption metric since it measures both the number of registers gated and the duration they are turned off, neither the "percentage of registers gated" metric nor the "average clock-gating efficiency" is sufficient to determine where power is being wasted.

Accordingly, a need exists for an improved method and apparatus for designing low power electronic devices which addresses various problems in the art that have been discovered by the above-named inventors where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

SUMMARY OF EMBODIMENTS OF THE INVENTION

Broadly speaking, the present invention provides a system, method and apparatus for designing an electronic device to have reduced power consumption by efficiently tracking power efficiency for one or more circuit blocks or modules using a combinatorial power performance metric that is defined to allow identification of critical enables to flip-flops and arrays in order to improve switching factor, and reduce capacitance loads on active nets. In operation, a design tool receives and evaluates an RTL design using atomic combinatorial power performance metrics to identify gating enable conditions which optimize power performance for the circuit by maximizing a weighted activity metric that is defined in terms of capacitance, switching activity and power effort. By combining switching activity, effective switching capacitance, and power effort into a single atomic metric, power consumption may be more accurately and efficiently estimated to track power efficiency improvements and diagnose power reduction.

In selected example embodiments, a method is disclosed for identifying critical enables using combinatorial power metrics. In the disclosed methodology, one or more sequential nodes are identified in a design file that represents an electronic device, module or unit. In the design file, each sequential node is an input or output of a respective sequential device or a node that gates a signal provided to a respective sequential device to enable or disable propagation of information through the sequential device. A combinatorial power metric value is determined for the sequential node(s) by computing, for each sequential node, an effective switching capacitance, a switching activity measure, and a power effort measure for all devices downstream from each sequential node up to a specified depth. In selected embodiments, the combinatorial power metric value is computed as a weighted average activity (WAA) metric for a standard cell portion of the design file by combining an effective switching capacitance for the standard cell portion of the design file, a switching activity measure for the standard cell portion of the design file, and a power effort measure for the standard cell portion of the design file. In other embodiments, the combinatorial power metric value is computed as a macro enable activity (MEA) metric for a macro block portion of the design file by combining an effective switching capacitance for the macro block portion of the design file, a switching activity measure for the macro block portion of the design file, and a power effort measure for the macro block portion of the design file. The combinatorial power metric value may be stored for comparison with a target power metric value to determine if power consumption by the portion of the electronic device meets a predetermined power performance goal. The computation of the combinatorial power metric value may be repeated over time to generate a plurality of combinatorial power metric values over time. In addition, a design goal status value may be computed and reported which indicates what percentage of the target power metric value has been met by the combinatorial power metric value.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
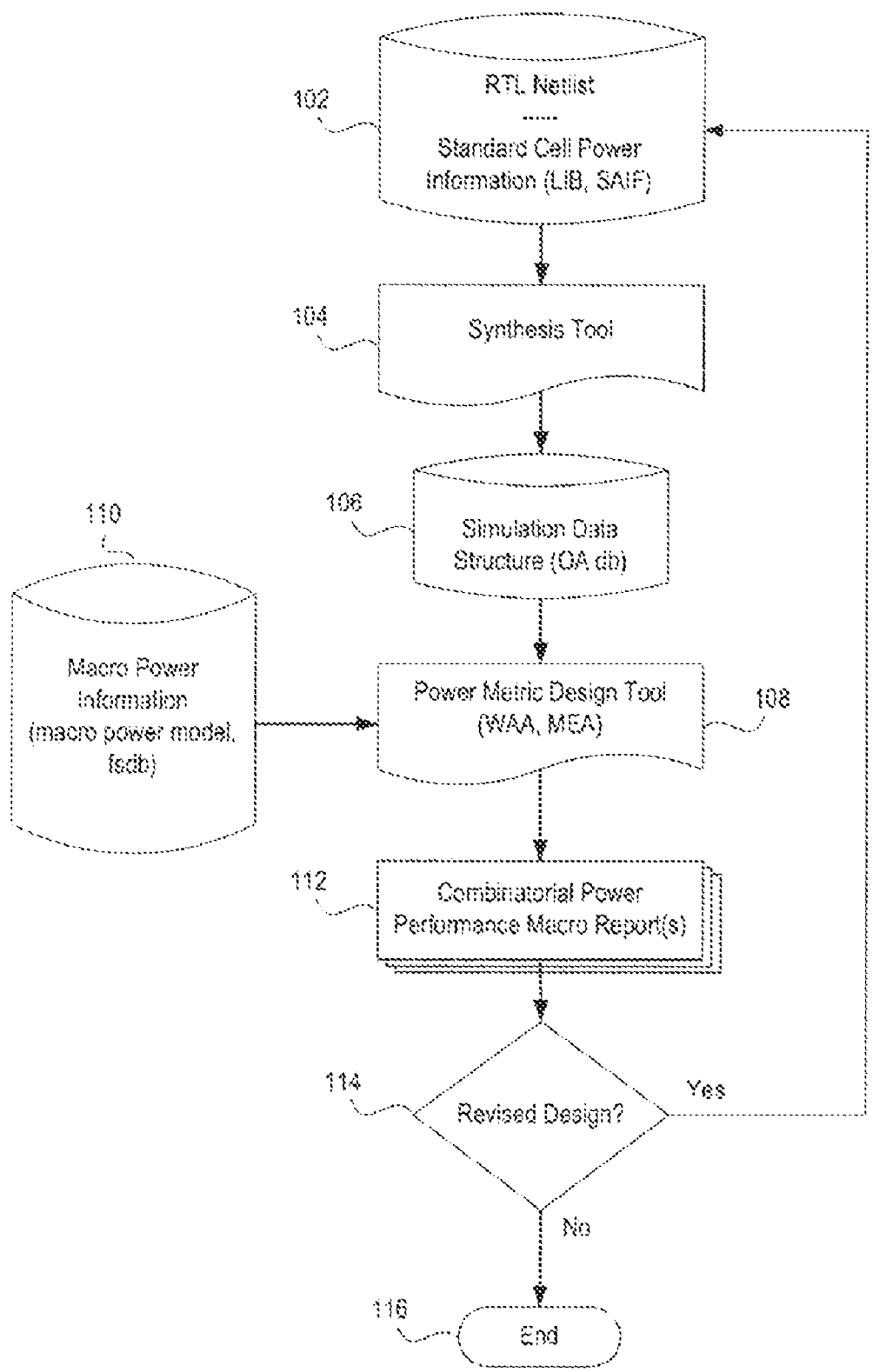
FIG. 1 illustrates a method for designing a low power electronic device using one or more combinatorial metrics.

A system, apparatus and method are disclosed for implementing a design tool to efficiently analyze and prioritize circuit nodes of an electronic device in terms of power consumption performance. This is accomplished with a metric calculation tool which calculates one or more combinatorial power performance metrics at selected circuit nodes to identify critical enables to flip-flops and arrays of an electronic device, thereby facilitating a designer to focus effort on high power portions of the design in order to improve switching factor performance and reduce capacitance loads on active nets. The disclosed performance metrics may be leveraged by generating power consumption reports over time which to track overall convergence of the power optimization efforts against predetermined performance objectives. In selected embodiments, the circuit nodes for which the power performance metrics are calculated can be the enable nodes connected to coarse or fine clock gaters. The clock gaters are used in the design to temporarily prevent portions of the design from storing or transmitting data, and thereby reduce the total power dissipated by the design. The combinatorial power performance metrics may include a standard cell power metric and a macro design power metric that are computed at selected circuit nodes to generate one or more power optimization weights based on power consumption modeling information, switching activity information and effective switching capacitance information for both standard cell and macro portions of a circuit design, respectively. The power performance metrics may be generated by a design tool which receives a register-transfer-level (RTL) representation of an integrated circuit and evaluates circuit behavior using atomic combinatorial power performance metrics to identify gating enable conditions which optimize power performance for the circuit by maximizing a weighted activity metric that is defined in terms of capacitance, switching activity and power effort. For example, a Weighted Average Activity (WAA) metric and a Macro Enable Activity (MEA) metric may be defined which combine activity, effective switching capacitance, and power effort into a single number for standard cell and macro portions of the electronic design, respectively. In operation, the design tool reads the various inputs (e.g., original RTL design, Liberty file, switching activity factors (such as VCD, SAIF or FSDB simulation vectors), macro power model information, and ESL-to-RTL mapping files) and generates the WAA and MEA metrics in a report format which facilitates the designer's review and revision of the high power portions of the design to generate a modified/optimized RTL design. The disclosed techniques are useful throughout the product development schedule, and can be used to evaluate both manually inserted clock gaters and auto-gated designs. The disclosed design tool is especially useful early in the design process before committing significant implementation resources. The circuit nodes for which the standard cell power metrics and macro design power metrics are calculated can be the enable nodes connected to coarse or fine clock gaters which are used in the design to temporarily prevent portions of the design from storing or transmitting data, and thereby reduce the total power dissipated by the design.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 illustrates in flow chart form a method for designing a low power electronic device using one or more combinatorial metrics for reporting and tracking power performance of a circuit design over time. The disclosed design methodology can be used to identify modules in a design file that may be gated at an associated node, and for each, determining one or more combinatorial power consumption metrics based on a plurality of power consumption factors (e.g., computed switching activity, effective switching capacitance, and power consumption models associated with said module/node). By computing the combinatorial power consumption metrics using one or more test bench power patterns, the power consumption for each module may be statically and/or dynamically determined, and then compared against predetermined targets or goals for power consumption.

In the design methodology illustrated in FIG. 1, the circuit being analyzed for power consumption may be represented as an RTL netlist that is stored in memory 102. When the circuit under analysis includes both standard cells and macro blocks, the memory 102 may also store power consumption modeling information for the standard cells, including but not limited to timing and power parameter information associated with particular standard cells (e.g., Liberty files) and switching activity information for individual standard cells derived from logic simulation to represent toggle information for the specified nets, such as RTL or gate level switching activity interchange format (SAIF) files.

The RTL netlist and additional standard cell power consumption modeling information passes through one or more synthesis tools 104 to form a simulation data structure that is stored in a suitable database 106. An Open Access database may be an example of a suitable database. As will be appreciated, the Open Access database is generally an object-oriented database wherein the modules, the ports and the instances may be represented as objects. There are a number of off-the-shelf or proprietary synthesis tools for transforming the different types of input data into the Open Access data structure format.

When there are macro blocks included in the circuit under analysis, power consumption modeling information for the macro blocks may also be stored in memory 110. The macro block power information stored in memory 110 may include power model information for specific macro blocks under predetermined test bench power patterns. In addition, the stored macro power information may include power simulation vectors for individual macro blocks that provides a quantification of test bench activity (e.g., Fast Signal Database (FSDB) files which provide toggle count profiles for specific macro blocks).

At block 108, the simulation data structure 106 and macro power information 110 are used by the power metric design tool 108 to simulate and analyze the subject circuit for power consumption by computing one or more combinatorial metrics. In particular and as described more fully below, the power metric design tool 108 may compute a Weighted Average Activity (WAA) metric for one or more circuit modules which provides a measure of enable efficiency for the standard cell components in the circuit design. In addition or in the alternative, the power metric design tool 108 may compute a Macro Enable Activity (MEA) metric for one or more circuit modules which provides a measure of enable efficiency for the macro block components in the circuit design.

At step 112, the power metric design tool may also be used to generate reports which list the computed metrics for various modules. Each report may also include computed metric values for one or more test bench power patterns. In the reports, the computed metrics may be compared to target or project goal metrics for purposes of identifying which modules should be prioritized for possible design improvements to reduce power consumption. By generating the reports over the course of successive design iterations, the combinatorial metrics for the standard cells and macro blocks may be tracked over time to enable effective tracking of improvements in power efficiency, while providing an easy diagnostic for power reduction.

At step 114, a decision is made on whether to redesign the identified circuit modules to reduce power consumption, such as by including additional clock gater circuits at critical enables for the standard cells and/or macro blocks. Upon redesigning the circuit, the power computation analysis of steps 102-112 may be repeated until the desired power consumption performance is achieved, at which point the process ends (step 116).

It will be appreciated that selected embodiments of the present invention may be applied at any point in the project development cycle, although as the quantity and quality of the data in the design file increases as the project progresses, higher accuracy and improved power reduction performance can be obtained. Even so, the disclosed methods do not require a completed design to yield highly useful results, and the disclosed combinatorial metrics can be used to make significant design decisions long before investing subsequent engineering resources.

Figure 2:
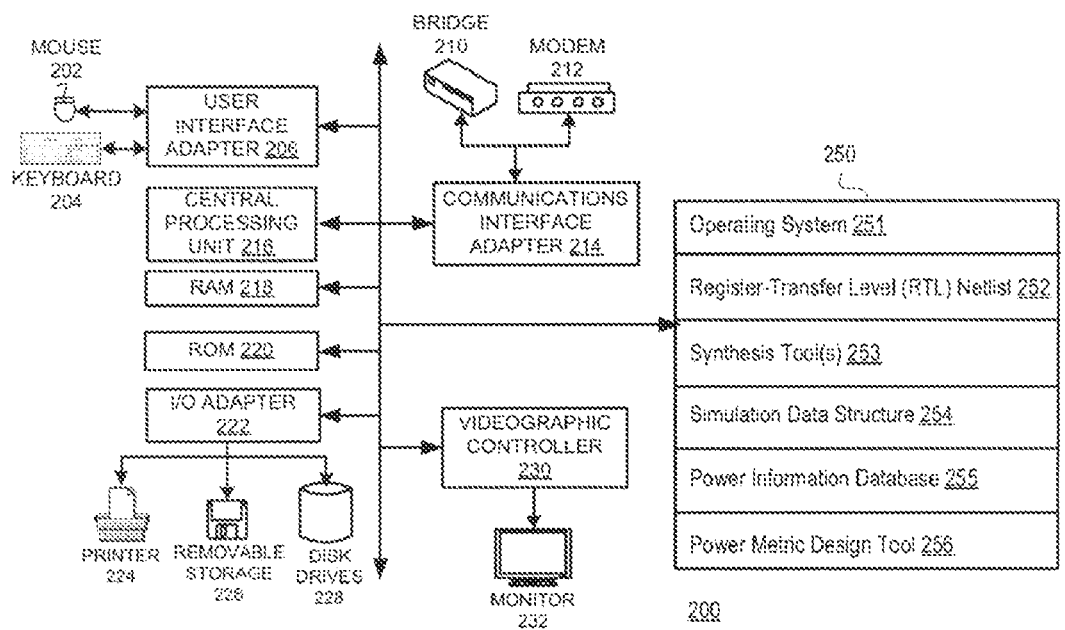
FIG. 2 illustrates a system for designing low power electronic devices which uses one or more combinatorial metrics to identify critical enable signals.

FIG. 2 illustrates in block diagram form an example computer system 200 for designing low power electronic devices using the disclosed combinatorial metrics to identify critical enable signals in order to improve switching factors, reduce power effort, and reduce effective switching capacitance loads. The example computer system 200 is illustrated to include devices connected to one or more central processing units 216 (which may be a conventional or proprietary data processor), memory (including random access memory 218, read only memory 220, and database memory 250), input output (I/O) adapter 222, a user interface adapter 206, a communications interface adapter 214, and a multimedia controller 230. As illustrated, the I/O adapter 222 is further connected to, and controls, printer 224, removable storage devices 226, disk drives 228, as well as other standard and proprietary I/O devices. The user interface adapter 206 can be considered to be a specialized I/O adapter which is illustrated as being connected to a mouse 202 and keyboard 204. However, it will be appreciated that the user interface adapter 206 may be connected to other devices capable of providing various types of user control, such as touch screen devices, etc. The communications interface adapter 1024 is shown as being connected to a bridge 210 (such as is associated with a local or a wide area network) and a modem 212. Finally, the multimedia controller 230 will generally include a video graphics controller capable of displaying images upon the monitor 232, as well as providing audio to external components (not illustrated). All of the computer system components are shown as being connected to a system bus 208 so that the various communication devices can communicate with one another and with external devices.

The example computer system 200 may be used to implement the system and methods described herein by storing data and programs in the memory device 250, which may be implemented in whole or in part with RAM 218, ROM 220, and/or disk drive 228 that are accessed by the CPU 216 in response to software instructions. The memory device 250 may include a high-speed random access memory or may also include a non-volatile memory, such as one or more magnetic disk storage devices. In addition or in the alternative, the memory device 250 may also include mass storages that are remotely located from the central processing unit(s) 216. As depicted, the memory device 250 preferably stores an operating system 251 that includes procedures for handling various basic system services and for performing hardware-dependent tasks. The memory device also stores a gate level or register-transfer-level (RTL) netlist 242 description of the circuit to be analyzed, where the netlist may be written in either the Verilog or VHDL design language. One or more synthesis tools are also stored in the memory device 250 for compiling or transforming the RTL netlist 252 and any standard cell power information into a hierarchical simulation data structure 254 which is also stored in the memory device 250 as representation of the data structure of the circuit to be analyzed. Power information 255 may also be stored in the memory device 250 for specifying the effective switching capacitance, switching activity and power effort of the standard cell and macro block components of the circuit to be analyzed. The memory device 250 stores the power metric design tool 256 for simulating the circuit represented by the simulation data structure 254 with power information specifications provided by the power information database 255, computing the combinatorial power metric(s) from the RTL netlist and power information, and generating reports which list the computed power metric data for various modules. In operation, the synthesis tool 253 instantiates circuit components, connects the circuit components, and sets up run-time simulation elements of the circuit design. In addition, the hierarchical simulation data structure 254 represents the circuit design as a hierarchically arranged set of branches, including a root branch and a plurality of other branches logically organized in a graph. Finally, the power metric design tool 256 generates reports and/or data tables which list the computed power metric data for various modules based on the circuit simulations and power metric computations.

It will be understood that the specific methods herein, which can include and functions of specific module, will typically be executed at a data processor device such as the computer system 200 shown in FIG. 2. Such methods may be in hardware, software, or combination thereof. For example, a specific method may be performed using software, which can include firmware, executed on one or more a processing modules. Thus, the RTL netlist, synthesis tool(s), simulation data structure, power information database, and power metric design tool may include executable procedures, sub-modules, tables, and other data structures. In other embodiments, additional or different modules and data structures may be used, and some of the modules and/or data structures listed above may not be used.

The design tool and method disclosed herein can be used to identify sequential nodes in the circuit design file, and to compute, for each node, a combinatorial power metric measure associated with the node based on the dynamically predicted operation of downstream devices. Based on a combination of switching activity, effective switching capacitance, and power effort for a specific unit, the computed power metric provides a measure of the enable efficiency by computing the efficiency of the enables as an average for a specific unit or module while running a particular workload. Thus, the operation of each downstream device is predicted dynamically by employing input test bench power patterns to simulate actual operation of the device. The criteria by which a device qualifies as a downstream device will be better understood with regard to FIG. 3 which illustrates an example interconnection of latches and non-sequential devices as represented by a design file representing an electronic device 300, where sequential devices 310-317 and sequential nodes 320-324 are connected across logic clouds 330-334. Sequential nodes of interest can be identified by the designer, or can be automatically identified by a suitable signal node naming convention, or component naming convention. It will be appreciated that a design file is a symbolic representation of the electronic device under evaluation and can contain information including the connectivity of the devices in the design, information about the logic function and electrical characteristics of the devices, and information about the capacitance at the interconnecting nodes.

In the example design file 300, latch 310 has a data input connected to node 340, a data output connected to node 341, an enable input connected to node 320, and a clock input connected to node 370. Logic cloud 330 includes a data input connected to node 341 and a data output connected to node 342. Latch 311 has a data input connected to node 342, a data output connected to node 343, an enable input connected to node 320, and a clock input connected to node 370. Logic cloud 331 includes a data input connected to node 343 and a data output connected to node 344. Latch 312 has a data input connected to node 344, a data output connected to node 345, an enable input connected to node 320, and a clock input connected to node 370. Latch 313 has a data input connected to node 346, a data output connected to node 347, an enable input connected to node 320, and a clock input connected to node 370. Logic cloud 332 includes a data input connected to node 347 and a data output connected to node 348. Latch 314 has a data input connected to node 348, a data output connected to node 349, an enable input connected to node 321, and a clock input connected to node 371. Latch 315 has a data input connected to node 350, a data output connected to node 351, an enable input connected to node 322, and a clock input connected to node 371. Logic cloud 333 includes a data input connected to node 351 and a data output connected to node 352. Latch 316 has a data input connected to node 352, a data output connected to node 353, an enable input connected to node 323, and a clock input connected to node 371. Logic cloud 334 includes a data input connected to node 353 and a data output connected to node 354. Latch 317 has a data input connected to node 354, a data output connected to node 355, an enable input connected to node 324, and a clock input connected to node 371.

Figure 3:
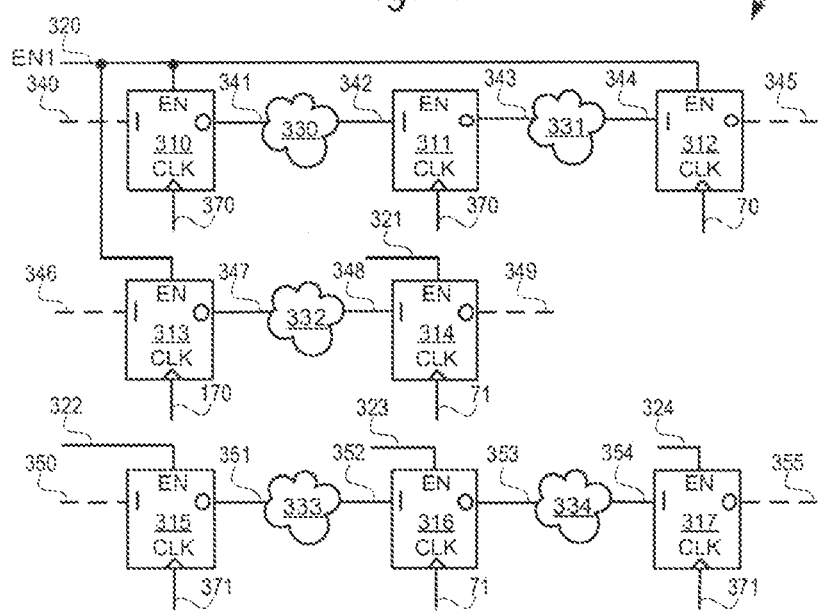
FIG. 3 illustrates an example interconnection of latches and non-sequential devices as represented by a design file.

As will be appreciated, FIG. 3 depicts an example interconnection of latches and non-sequential devices as represented by a design file. Though not explicitly shown, the logic clouds 330-334 contain one or more non-sequential logic gates, such as static or dynamic combinatorial logic gates. It will be appreciated that while the logic clouds 330-334 are illustrated to have a single data input and a single data output, that there can be additional inputs and outputs. The one or more non-sequential logic gates provide at least one data input and one data output to the logic cloud. As depicted, different latches are enabled by separate enable signals, thereby allowing the functionality of the different logic clouds to be separated. In particular, the signal EN1 is provided to node 320 and is received at the enable input (EN) of latches 310-313. Signal EN2 is provided to node 321 and is received at the enable input of latch 314. Signal EN3 is provided to node 322 and is received at the enable input of latch 315. While latches are shown to represent sequential devices, it will be appreciated that other sequential devices having clock inputs that can be gated can be used as well, including but not limited to flip-flops. The signals EN1, EN2, and EN3 represent any number of enable signals that can be received by any number of latches. Likewise, while nodes 370 and 371 are shown as being connected to the clock input of the latches, it will be appreciated that one of any number of nodes can be connected to any latch clock input.

In this context, the term "clock event" refers to an active assertion on the clock input of the sequential device which will cause the device to update its internal logic state dependent upon the logic value applied to its corresponding data input. Depending on the type of sequential device, the clock event might be 1) a transition of the clock, either rising or falling, such as that utilized by an edge sensitive latch, or 2) a specific logic state, a logic high or a logic low, such as utilized by a level sensitive latch. When the internal logic state of the sequential device changes, so will its data output(s). With the sequential latch devices 310-317 illustrated in FIG. 3, each latch can store the value present on a data input (I) following a clock event on a clock input (CLK). The latches 310-317 also include a data output (O) that represents the value stored in the latch. Each of these latches 310-317 also includes an enable input (EN) that further qualifies whether the latch will store the value present on the data input during the clock event. If the signal received at the enable input is active, then the state of the latch will be updated as a result of a clock event. If the signal received at the enable input is inactive, then the state of the latch will not be updated as a result of a clock event. Wherein reference is made to the latches having a single data input, it should be understood that an alternative sequential device can have more than one data input that encodes the value that is stored within the device. The sequential devices can also have more than one data output that can change state as a result of a clock event.

Figure 4:
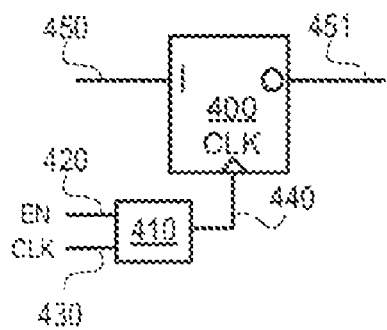
FIG. 4 illustrates an example latch or sequential device having a clock input that is gated by an enable signal.

FIG. 4 illustrates how a clock signal CLK (provided to node 430 of device 410) can be gated by an enable signal EN (provided to node 420 of device 410) to produce a gated clock signal that is provided to node 440. Node 440 provides the gated clock signal to the clock input of latch 400. The signal EN will gate (allow or prevent) the propagation of the clock signal onto node 440. When the enable input of device 410 is in the inactive state, node 440 is prevented from being asserted, and the logic value present on the data input of latch 400 (node 450) will not be stored by the latch. Conversely, if the enable input is set to the active state, then node 440 will be asserted and the value present on the data input of the latch will be stored by the latch. Because each of nodes 420, 430, 440, 450, and 451 either controls a clock provided to latch device 400, or their change in state controls switching activity downstream from latch 400, they are considered sequential nodes.

Figure 5:
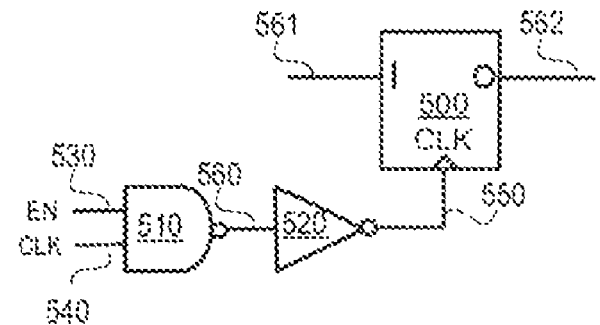
FIG. 5 illustrates another example latch or sequential device having a clock input that is generated by a clock gater circuit under control of an enable signal.

FIG. 5 includes one of any number of circuits that can achieve the function of component 410 in FIG. 4. In this example, the inputs of a NAND gate 510 receive an enable signal EN at node 530, and a clock signal CLK at node 540. The output of the NAND device 510 is connected to the data input 560 of an inverter device 520. The data output of the inverter 520 is connected to node 550 and drives the CLK input of latch 500. Node 550 can be referred to as a gated clock node. The behavior of the circuit illustrated at FIG. 5 is functionally similar to that previously described for FIG. 4, though any number of other circuits can achieve the same goal of gating a clock signal. Variations can include the use of multiple enabling or qualifying signals and multiple clock signals. The circuit creating the gated clock signal, i.e., the NAND gate 510, will be herein referred to as a clock gater. Nodes 530, 540, 560, 550, 561, and 562 can all be considered to be sequential nodes associated with latch 500.

Figure 6:
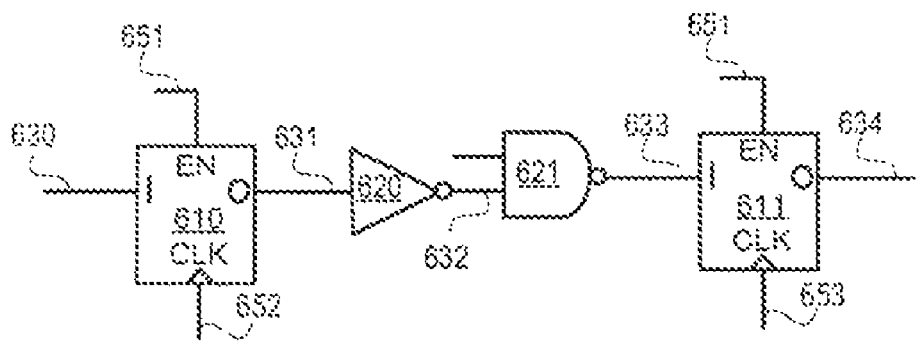
FIG. 6 illustrates another example latch or sequential device having a data input that is gated by an enable signal at an input latch.

As disclosed herein, the reference to an enabling signal can include a signal received at the enable input of a latch, or to the enabling input of a clock gater circuit such as those shown in FIGS. 4-5. In either case, the enabling node is considered one of the sequential nodes associated with a sequential device. A latch can also receive an enabled data input that is controlled by a clock gater circuit, such as illustrated in FIG. 6 with the example circuit including latches 610 and 611, an inverter 620, and a NAND device 621. The data output of latch 610 is connected to node 631. The data input of inverter 620 is connected to node 631 and its data output is connected to node 632. One data input of NAND device 621 is connected to node 632 and its output connects to node 633. Node 633 is connected to the data input of latch 611. Devices 620 and 621 are considered downstream of device 610. In one embodiment, latch 610 can represent latch 313 of FIG. 3, latch 611 can represent latch 314 of FIG. 3, and inverter 620 and NAND device 621 can represent the logic cloud 332 of FIG. 3.

In a sequential circuit such as shown in FIG. 3, power is consumed every time a node switches levels. Such nodes switches occur not only when a primary flip-flop input switches, but also in response to switches on the output of a flip-flop. Whether a flip-flop output switches is governed by the presence of switching at the flip-flop input and the state of the clock pin which, as shown in FIG. 3, may be controlled by a clock enable signal EN. As a result, an enabling signal at a specified sequential device can be used to prevent clocking of a portion of the circuit design that is downstream of the enable node, thereby reducing the switching activity and power dissipation of the downstream portions. There is also a capacitance associated with the enabling node itself, or, in the case of the clock gater circuit, additionally the sum of the node capacitances associated with said clock gater circuit that switches when the enabling signal is active. The total of the aforementioned capacitances can be called the enable capacitance load, or CL. Finally, there is an effective switching capacitance and associated switching activity associated with the downstream devices caused by any level switching at a specified sequential device.

In view of the foregoing, any attempt to model or estimate power consumption at a particular node in a sequential circuit needs to take into account, not only the effective switching capacitance at that node, but also which gates or wires are switching every cycle, both at the node in question and with downstream devices. These factors are included in a power consumption model disclosed herein which computes combinatorial power metric values for both standard cell and macro block portions of the circuit design. Each power metric takes into account not only the capacitive load driven by a specified clock gater, but also the switching activity and the effective switching capacitance at the designated node, thereby efficiently combining a plurality of power measures into a single metric. With this power metric, the critical clock enables (gated clocks) and logic gates in a circuit can be identified and prioritized for further design optimization to reduce power consumption through an iterative process whereby clock gaters are inserted into the design so that the re-designed circuit can be analyzed again for power consumption performance until the desired performance improvement is achieved.

In selected embodiments, a combinatorial power metric is determined for the standard cell type modules in a circuit design by computing a weighted average activity (WAA) metric which provides a measure of enable efficiency at a specific enable point in the circuit while running a specified workload by computing the total effective switching capacitance for the sum of all N enables in a complete design, and then dividing the total effective switching capacitance by the sum of all enable weights in the complete design. In accordance with selected embodiments, the WAA metric is computed as follows:

$$WAA = \sum_{k=0}^{N}(W_k * A_k) \bigg/ \sum_{k=0}^{N}(W_k)$$

where k spans over all standard cell enables in the circuit design, N is the total number of unique enables in a circuit, where $W_k$ is the weight for enable k, and where $A_k$ is the activity measure (or probability of enable being high) on enable k (where $A_k=1.0$ for free running clocks). In selected embodiments, the enable weight term $W_k$, is based on a switched capacitance measure, while in other embodiments, it is based on a fanout measure for the enable point. In addition, the activity measure $A_k$ may be used to represent the percentage of time that enable k is "on" during a specified test bench power pattern.

In circuit designs where enable k controls M flops, the enable weight term $W_k$, from the WAA metric is defined by:

$$W_k = CL_k + \sum_{i=0}^{M} EC_{k,i} * IA_i$$

where $CL_k$ is the capacitive load driven by clock gater of enable k, where $EC_{k,i}$ is the effective switching capacitance tied to the output of flip-flop i, and where $IA_i$ is the input activity at flip-flop i. In this setting, the input activity factor IA can be de-rated based on the function of the block or type of the application being analyzed.

The effective switch capacitance ($EC_{k,i}$) term in the WAA metric represents the sum of the predicted switching capacitances at an output of the sequential device (e.g., flip-flop) and at the nodes connected to the outputs of all qualifying devices downstream from the sequential device. To account for effective switching capacitance in the circuit design, the effective switch capacitance ($EC_{k,i}$) at the output of flip-flop i can be calculated as:

$$EC_{k,i} = \sum_{j=0}^{n} (1 + SC_{i,j}) * C_{i,j} * d_{i,j}$$

where $SC_{i,j}$ is the internal power factor for gate $g_{i,j}$ at a sequential node k and sequential device i, where $C_{i,j}$ is the total capacitive load (wire+gate) that is driven by gate $g_{i,j}$, and where $d_{i,j}$ is the probability of output switching for gate $g_{i,j}$. The variables i and j represent the array of downstream devices that are included in the calculation of the total effective switching capacitance for sequential device i, where the variable i can denote the depth downstream from the sequential device under evaluation, and the variable j can enumerate the multiple branches in the interconnection of the non-sequential devices, if there are branches. In this equation, the internal power factor $SC_{i,j}$ for gate $g_{i,j}$ includes short circuit power (NAND, NOR, etc.) and internal buffers (flops/latches). While there may be a typical value set for the internal power factor $SC_{i,j}$ (e.g., 0.3 to 0.4), it will be appreciated that different values can be used for different gates/flops, depending on gate topology/EFO, etc.

In the effective switch capacitance equation, the output switching probability term $d_{i,j}$ for gate $g_{i,j}$ represents the probability that the output of a gate $g_{i,j}$ driving a node being evaluated will switch in response to a signal switching at the upstream latch, and is dependent upon the probability that an input signal to the gate $g_{i,j}$ will switch. This probability is represented by the equation:

$$d_{i,j} = pe_{i,j} * d_{i,j-1}$$

where $pe_{i,j}$ is the power effort of gate $g_{i,j}$ which is defined as the ratio of number output switches to the number of possible combinations of input switches. In other words, the power effort is a probability of output switching based on the logic function of the gate which in turn is a function of the switching probability of nodes upstream from the device. With the example of an inverter circuit, the power effort PE=1.0, indicating that the inverter output will switch whenever the inverter input switches. Similarly, for a two-input NAND or NOR gate, the power effort PE=½ since the output switches only half of the time. And for an n-input NAND or NOR gate, the power effort $PE=\frac{1}{2}^{(n-1)}$.

Stated more generally, the power effort for an n-input logic gate driving a specific node under consideration is PE= $(2*NL1*NL0)/(2^n*(2^n-1))$, where n is the number of inputs to the logic gate, where the total number of possible input states (S0, S1 . . . , Sn-1) is $2^n$, where the total number of possible input state transitions (S0-->S1, S2, . . . Sn-1; S1-->S0, S2 . . . , Sn-1, etc.) are $(2^n*(2^n-1))$, and where NL0 is the number of input states resulting in output Logic-zero and NL1 is the number of input states resulting in output Logic-one, so that NL0+NL1=2^n. Thus, for a two input NAND gate where n=2, NL0=1, and NL1=3, the power effort PE=(2*3*1)/(4*3)=0.5. As will be appreciated, the power effort can be computed for any predetermined depth as specified by the user through an option on the design tool, where a first downstream device represents depth 1, the devices connected directly to downstream from the first downstream device represents depth 2, etc. In the design tool, the default depth may be set to one, but the depth can be increased.

As seen from the foregoing, the combinatorial power metric WAA provides a power estimation computation for the standard cell portion(s) of the circuit design that combines switching activity (e.g., $A_k$), effective switch capacitance (e.g., $EC_{k,i}$), and power effort (e.g., $p_{i,j}$), all in one number. With such a combinatorial power metric, the power efficiency of inserted clock gaters can be estimated to show where power is being wasted since the metric takes into account the percentage of registers gated, the time the registers are being gated, and the effective switch capacitance as well.

As will be appreciated, circuit designs typically include both standard cell and macro block portions, where the macro blocks or arrays are full-custom designs with complex dynamic logic and lot of storage elements (bit-cells) that make it difficult to crawl through the logical netlist for the macro block to calculate weight enable values. To address this problem, individual macros can be modeled into corresponding power performance models with ESL macro modeling tools that associate switching capacitance values with given macro events, such as read/write/cam operations. In tools such as PowerProCG or Cooolate, the only way to analyze the power consumption of the macro block portions is to have power models for them, such as Liberty models, which usually are not available at this design stage, especially in full custom design flows. In the present disclosure, macro power models provide switching capacitance values that are used as macro enable weights that are mapped to the RTL, and switching activity information is retrieved for the corresponding macro enable. Based on these inputs, the metric tool computes a combinatorial power metric for the macro block modules in a circuit design by computing a macro enable activity (MEA) metric which provides a measure of enable efficiency at a specific enable point in the circuit while running a specified workload. In selected embodiments, a combinatorial macro power metric MEA is determined by computing the total effective switching capacitance for the sum of all N macro enables in a complete design, and then dividing the total effective switching capacitance by the sum of all macro enable weights in the complete design. In accordance with selected embodiments, the MEA metric is computed as follows:

$$MEA = \sum_{k=0}^{N} (MW_k * A_k) \Big/ \sum_{k=0}^{N} (MW_k)$$

where k spans over all macro block enables in the circuit design, N is the total number of unique enables in a circuit, where $MW_k$ is the macro weight or capacitance for the enable associated with macro block k, and where $A_k$ is the activity measure (or probability of enable being high) on enable k. In selected embodiments, the enable macro weight term $MW_k$, is determined by (1) creating a mapping of macro/array enables and corresponding power performance model names, (2) setting the macro model energies as macro weights, and (3) using the map and macro weights, along with event switching information from the switching activity file, to compute the MEA metric. In the MEA metric, the activity measure $A_k$ is the time that macro k is active, meaning that its enable is active according to its polarity which is active_high or active_low for a specified test bench power pattern.

Figure 7:
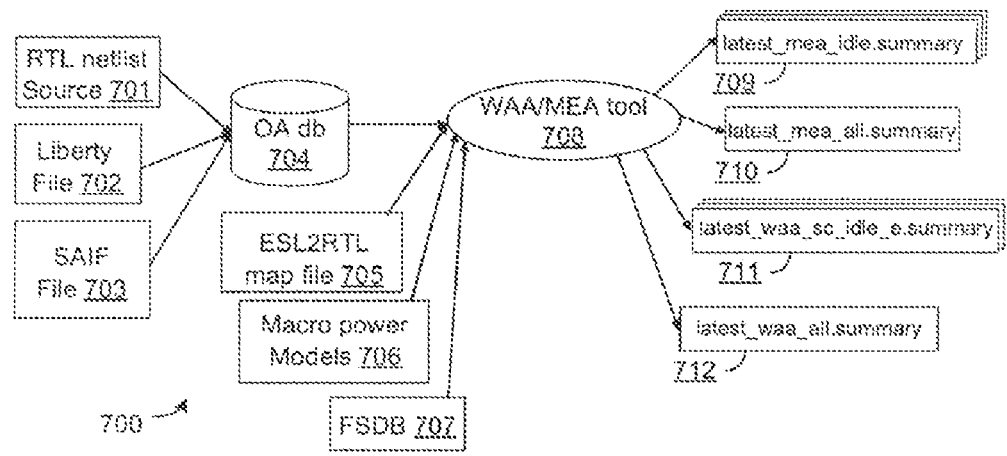
FIG. 7 is a data flow diagram illustration for a combinatorial metric design tool.

To illustrate how the combinatorial metrics for standard cell and macro block power consumption may be computed, reference is now made to FIG. 7 which illustrates a data flow diagram 700 illustration for a combinatorial metric design tool which generates both standard cell and macro block power metrics in accordance with selected embodiments of the present invention. For power consumption analysis of the standard cells, a gate level or RTL netlist 701 description of the circuit to be analyzed is provided (e.g., in Verilog or VHDL design language), where the RTL netlist data specifies the design connectivity, the type of cells used in the design, etc. In addition, a Liberty file 702 is provided that provides an ASCII representation of the timing and power parameters associated with the standard cells, including wireload and timing models and data to calculate I/O delay paths, timing check values, interconnect delays, and static and dynamic power consumption internal to the cell. Finally, switching activity information 703 may be provided for the standard cells to specify switching activity in terms of the toggle counts of the various nodes in the RTL netlist of the design. For example, the switching activity information 703 may be provided as switching activity interchange format (SAIF) files which represent the toggle rate information for specified nets which are constructed with standard cells. The input data 701-703 for the circuit design and associated switching activity information may be transformed by one or more synthesis tools into an appropriate data exchange format 704, such as the OpenAccess open standard data API and reference database.

To compute the combinatorial metric(s) for the macro/array blocks, switching activity and power model information for the macro/array blocks must also be generated. To this end, the data flow 700 retrieves event switching information for the macro/array blocks from the RTL netlist source 701 and/or SAIF file 703. Switching activity information for the macro/array blocks may also be obtained from the Fast Signal Database (FSDB) files 707 that provide toggle information for one or more specified test bench activity patterns. In addition, power modeling information for the macro/array blocks is computed for the circuit design. In the depicted embodiment, the mapping and power model information for the macro/array blocks is retrieved from a map file 705 and macro power model file 706. The macro power model file 706 provides predetermined performance models for the macro/array blocks for selected test bench power patterns, such as by associating effective switching capacitance weights with pre-determined macro/array events (e.g., read, write or cam operations) for one or more test bench power patterns. To transform the power modeling information for the macro/array blocks into a workable format, the map file 705 associates the macro/array performance models from the power model file 706 with the associated the macro/array enables, such as by providing an ESL-to-RTL map file. Of course, it will be appreciated that power consumption model information for the macro/array blocks can be retrieved from a single macro power model source file if naming conventions are enforced from the ESL domain to the RTL and netlist domains.

At the metric tool 708, the RTL netlist, switching activity information, and power model information for the standard cells and macro/array blocks are retrieved and processed to generate the combinatorial power metric(s) which may be published in one or more reports 709-712. In particular, the metric tool 708 generates the standard cell representation(s) for the circuit design based on the RTL netlist 701 and Library file 702. The metric tool 708 also estimates power model information and capacitances for the standard cells based on a wire load model provided by the Library file 702. In addition, the metric tool 708 reads the macro power model file(s) 706 to obtain a list of events with their respective energy values, and also reads the ESL-to-RTL mapping file(s) 705 to obtain a list of enables, their polarity and their corresponding ESL power model. Finally, the switching activity factors are read from the SAIF and/or FSDB files.

Based on the retrieved design information, the metric tool 708 computes WAA and/or MEA metrics, such as by using the equations disclosed hereinabove. The computed metrics may be used to generate one or more reports 709-712 for use in further optimizing the enable efficiencies in the circuit design. These reports may include a summary report 709 for the latest MEA metric values in a specified test bench power pattern (e.g., idle), a summary report 710 for the latest MEA metric values for all test bench power patterns, a summary report 711 for the latest WAA metric values in a specified test bench power pattern (e.g., sc_idle_e), a summary report 712 for the latest WAA metric values for all test bench power patterns, etc. In an example report, combinatorial power metric data is provided for different circuit modules under different test bench power patterns. For each computed power metric and test bench power pattern, there may also be provided an associated target performance measure and status indication of how the power performance for the module is to a defined project or performance goal. An example report showing the computed WAA power metric for selected modules in table format is set forth below:

|        | max_pwr_ptrn |      |      |        | med_pwr_ptrn |      |      |        | low_pwr_ptrn |      |      |        |
|--------|------|------|------|--------|------|------|------|--------|------|------|------|--------|
| module | $W_k$ | WAA  | Goal | Status | $W_k$ | WAA  | Goal | Status | $W_k$ | WAA  | Goal | Status |
| cu     | 5775 | 0.07 | 0.06 | 117%   | 4358 | 0.06 | 0.06 | 100%   | 4408 | 0.06 | 0.06 | 100%   |
| fu     | 1281 | 0.07 | 0.08 | 92%    | 1281 | 0.07 | 0.08 | 92%    | 1281 | 0.07 | 0.08 | 92%    |
| if     | 8116 | 0.16 | 0.24 | 65%    | 4543 | 0.09 | 0.09 | 98%    | 2346 | 0.04 | 0.06 | 71%    |
| de     | 9516 | 0.3  | 0.51 | 59%    | 8069 | 0.25 | 0.33 | 76%    | 1302 | 0.04 | 0.06 | 67%    |
| ia     | 9423 | 0.40 | 0.33 | 122%   | 5717 | 0.24 | 0.11 | 216%   | 2212 | 0.09 | 0.06 | 150%   |
| fa     | 1729 | 0.07 | 0.06 | 122%   | 2095 | 0.09 | 0.06 | 149%   | 1982 | 0.08 | 0.06 | 139%   |
| mx     | 10398| 0.24 | 0.3  | 80%    | 3709 | 0.09 | 0.06 | 150%   | 3331 | 0.08 | 0.06 | 133%   |
| ly     | 3578 | 0.08 | 0.06 | 133%   | 3515 | 0.08 | 0.06 | 133%   | 3522 | 0.08 | 0.06 | 133%   |
| fp     | 28836| 0.45 | 0.44 | 102%   | 1735 | 0.03 | 0.06 | 50%    | 1134 | 0.02 | 0.06 | 33%    |

In this example report, weighted activity data is computed for a plurality of processor circuit modules, including a cache unit (cu), functional unit (fu), instruction fetch unit (if), instruction decode unit (de), instruction arbiter (ia), fixed point unit (fa), memory arbiter (mx), load store (ly), and floating point unit (fp). The weighted activity data may include the weight $W_k$ which is the total effective switching capacitance for the enable at the specified module. In addition, the weighted average activity (WAA) power metric for the module may be included. For each module, the weighted activity data is computed for one or more test bench power patterns. For simplicity, the table shows weighted activity data for three power pattern—"max_pwr_ptrn", "med_pwr_ptrn", and "low_pwr_ptrn"—in decreasing level of switching activity. The example report also shows target performance data for each module and power pattern, including a WAA goal value and a status value indicating the percentage completion for meeting the specified power consumption goal. The status indication may provide a percentage quantification of how close the computed WAA power metric is to meeting the target WAA power metric. For example, the status value may be computed by dividing the computed WAA metric by the target WAA metric to indicate what percentage of the target metric has been reached with the current design. The status indication may also provide an additional visual coding to identify the computed WAA power metric values that have not reached the target WAA power metric. In an example implementation, a first visual coding scheme may be represented by highlighting the "status" percentage values that are above a target threshold percentage (e.g., 100%) with a flag or formatting indication (e.g., red or bold-faced). Thus, the cu, ia, fa, ly, and fp modules are shown in the table as being above the target power performance measure for the max_pwr_ptrn test bench power pattern. In addition or in the alternative, a second visual coding scheme may be used to highlight the "status" percentage values that have met or exceeded a target threshold percentage (e.g., 100%) with another flag or formatting indication (e.g., green). Thus, the cu, fu, if, de, and fp modules are shown in the table as having met or exceeded the target power performance measure for the med_pwr_ptrn test bench power pattern. By generating reports of weighted activity data in table format such as shown above, a graphical representation is provided to show weighted activity data across multiple circuit modules and power patterns and how they track with respect to project goals.

As circuit design changes are made to reduce power consumption, additional reports may be generated to enable week-to-week tracking. An example comparative report is shown below:

|        | WAA      |              | MEA      |           |
|--------|----------|--------------|----------|-----------|
| Module | Unit-Idle | vs. new target | Unit-Idle | vs. target |
| cu     | 0.1705   | 341%     | 0.0370   | 370%  |
| fu     | 0.1227   | 245%     | 0.0000   | 0%        |
| if     | 0.0762   | 152%     | 0.0780   | 98%       |
| de     | 0.1081   | 216%     | 0.0000   | 0%        |
| ia     | 0.1131   | 226%     | 0.4350   | 435%  |
| mx     | 0.1470   | 294%     | 0.0000   | 0%        |
| fp     | 0.0253   | 63%          | 0.0000   | 0%        |

In the depicted comparative report, computed WAA and MEA power metric values are displayed in the "Unit-Idle" columns for a typical "idle" test bench power pattern for the identified or a plurality of processor circuit modules. The comparative report also lists status value indications providing a percentage quantification of how close the computed WAA and MEA power metric values are to meeting the target WAA and MEA power metric values. The status indication may also provide an additional visual coding to identify the computed WAA and MEA power metric values that have (and/or have not) reached the target values. Thus, the WAA values for the cu, fu, if, de, ia, and mx modules are shown in the table as being above the target WAA power performance measure for the unit-idle test bench power pattern by the specified percentages, and the MEA values for the cu and ia modules are shown in the table as being above the target MEA power performance measure for the unit-idle test bench power pattern by the specified percentages. Though not shown, the target WAA and MEA power metric values may also be listed.

In addition to providing comparative reports with respect to the target performance, historical reports can also be generated to enable week-to-week tracking of circuit design changes during previous design iterations. For example, a table listing may be provided to show the current computed WAA and/or MEA power metric values, as well as the computed WAA and/or MEA power metric values from past designs, along with a quantification of the changes in values, the target values, and a percentage quantification indication of how close the current computed WAA/MEA power metric values are to meeting the target WAA and MEA power metric values.

Figure 8:
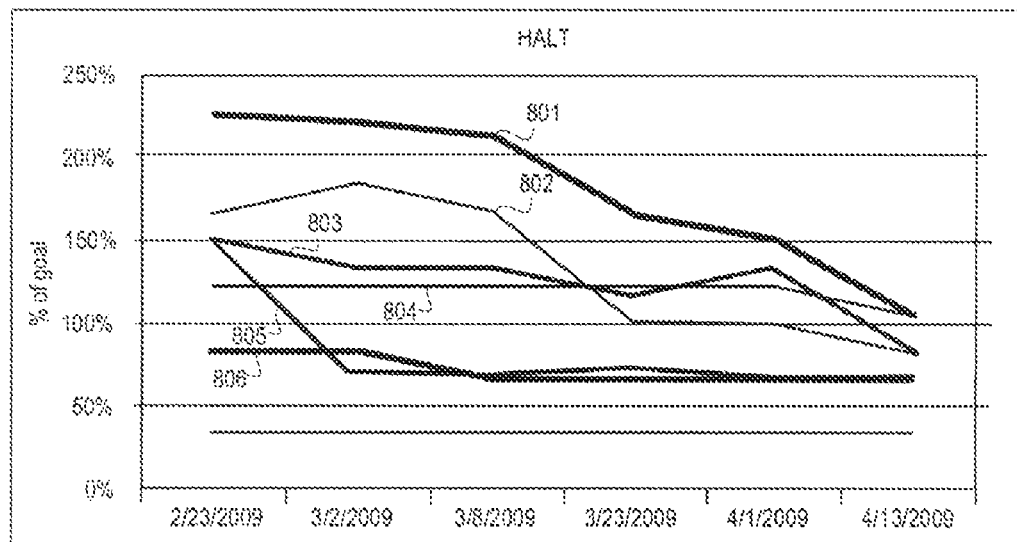
FIG. 8 is a graphical status representation showing the tracking over time of multiple base line modules in a selected power pattern with respect to project goals.

As seen from the description provided herein, computational algorithms have been described for calculating weights for standard cell and macro/array blocks which combine a plurality of performance metrics. The combinatorial metrics can be used to evaluate the power consumption of individual circuit modules against target or design performance goals indicated in percentage terms, and can also be included in periodically generated reports to track improvements in power efficiency in terms of the percentage compliance with the target power consumption goal. The periodic reporting of percentage compliance with design performance goals can be visually conveyed with a graphical report such as shown in FIG. 8 which depicts a graphical status representation showing the tracking of design goal percentage over time for multiple base line modules in a selected power pattern. As illustrated, the design goal percentage for the instruction arbiter unit (ia) tracks over a plot line 801 which starts at 225% of the target performance goal (on Feb. 23, 2009), and improves to just above the target performance goal (on Apr. 13, 2009). In addition, there are significant improvements in the design goal percentage for the cache unit (cu) as seen from the plot line 802 which starts at about 170% of the target performance goal (on Feb. 23, 2009), and improves to about 80% of the target performance goal (on Apr. 13, 2009). While the design goal percentage for the memory arbiter unit (mx) and instruction fetch unit (if) both start at about 150% of the target performance goal (on Feb. 23, 2009), the plot line 803 for the memory arbiter unit (mx) improves eventually to about 80% of the target performance goal (on Apr. 13, 2009), while the plot line 805 for the instruction fetch unit improves to just under 75% of the target performance goal (on Apr. 13, 2009). The plot line 804 for the functional unit (fu) shows that the design goal percentage holds fairly steady, improving from about 125% of the target performance goal (on Feb. 23, 2009) to just above the target performance goal (on Apr. 13, 2009). Finally, the plot line 806 for the instruction decode unit (de) shows that the design goal percentage exceeds the target performance goal (at about 85% of the target performance goal on Feb. 23, 2009), and drops slightly to about 70% of the target performance goal (on Apr. 13, 2009).

Using the combinatorial power metrics and associated reporting techniques described herein, priority ranking of the plurality of sequential nodes can be based on how much each node contributes to the total effective switching capacitance at all sequential nodes under evaluation in the design. The results of the procedures disclosed can be used to establish or affect other operations in the design process. Prioritizing enable nodes of an electronic device by employing a weighting system can allow designers to concentrate on logic areas of the device that can yield higher returns in terms of power reduction for resources invested. For example, the results can be used to guide the redesign of the course and fine gater enable logic structure. The results can be used to select one sequential node based upon its effective switching capacitance, and initiate a layout operation, such as a floor planning, physical placement of device, and routing of connections between devices, based upon its selection to optimize device locations and to minimize routing length for nodes downstream from a sequential node with a high effective switching capacitance. The results can be used to support manual or automated device substitution algorithms such as consolidating logic devices into more complex logic devices, thus lowering the switching probability of downstream nodes. Other optimization operations can include advising device downsizing algorithms. The operations described are only examples of the many such operations than can be undertaken.

By now it will be appreciated that a method, apparatus and system are disclosed for identifying critical enable nodes in a circuit design by storing a design tool in the form of executable instructions and data on a recordable storage medium for execution by one or more processing devices. Under control of the executable instructions and data, a design file representing an electronic device is accessed to identify each sequential node in the design file that gates a signal provided to a respective sequential device to enable or disable propagation of information through the sequential device. Based upon an effective switching capacitance value, power model information, and switching activity information for each identified sequential node, a power performance weight is calculated at the identified sequential node to identify critical enables for the electronic device. This calculation can be performed by accessing power model information for each identified sequential node in the electronic device, accessing switching activity information for each identified sequential node in the electronic device, and calculating an effective switching capacitance for each identified sequential node. The power performance weights for the identified sequential node(s) are then used to calculate a normalized sum of all power performance weights. In selected embodiments, the normalized sum of all power performance weights is a weighted average activity (WAA) metric for a standard cell portion of the design file, while in other embodiments, the normalized sum of all power performance weights is a macro enable activity (MEA) metric for a macro block portion of the design file. The normalized sum of all power performance weights is compared with a baseline value to evaluate power consumption at the electronic device. In selected embodiments, the baseline value is a target performance value, in which case the normalized sum of all power performance weights is compared with the target performance value to determine if power consumption at the electronic device meets a predetermined power performance goal, thereby facilitating a designer to improve switching factor performance and reduce capacitance loads at high power portions of the electronic device. In other embodiments, the baseline value is a previously computed normalized sum of all power performance weights from an earlier design for the electronic device, in which case the current normalized sum is compared with the previously computed normalized sum to determine if power consumption at the electronic device has improved with respect to power performance of the earlier design for the electronic device. Based on the comparison, a report may be generated to track overall convergence of the normalized sum of all power performance weights to the baseline value.

In other embodiments, there is disclosed a software-based design tool which is implemented with a computer readable storage medium that stores instructions operable to control operation of a data processor. As disclosed, the design tool accesses a design file representing an electronic device, and then identifies a plurality of sequential nodes for a specified circuit module in the design file, where each of the plurality of sequential nodes gates a signal provided to a respective sequential device to enable or disable propagation of information through the sequential device. For each of the plurality of sequential nodes, a combinatorial power metric for the plurality of sequential nodes is computed based upon an effective switching capacitance, a switching activity measure, and power effort measure associated with a first test bench power pattern, and is then stored. In selected embodiments, the computed combinatorial power metric is a weighted average activity (WAA) metric for the plurality of sequential nodes for a specified standard cell type circuit module in the design file. In other embodiments, the computed combinatorial power metric is a macro enable activity (MEA) metric for the plurality of sequential nodes for a specified macro block type circuit module in the design file. The combinatorial power metric is then compared with a target power metric value to determine if power consumption at the specified circuit module meets a predetermined power performance goal. In addition, a report is generated to track overall convergence of the combinatorial power metric to the target power metric value for the specified circuit module. The design tool may also include instructions to select one of the plurality of sequential nodes in the specified circuit module based upon its combinatorial power metric, and to initiate a layout operation on the selected sequential node.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, principles of the invention have been described above in connection with specific embodiments. However, one of ordinary skill in the art appreciates that one or more modifications or one or more other changes can be made to any one or more of the embodiments without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method comprising:
identifying, by a computing device, one or more sequential nodes in a design file, wherein the design file represents at least a portion of an electronic device, where each sequential node of the design file is an input or output of a respective sequential device or a node that gates a signal provided to a respective sequential device to enable or disable propagation of information through the sequential device;
determining a combinatorial power metric value for the one or more sequential nodes by computing, for each sequential node, an effective switching capacitance, a switching activity measure, and a power effort measure for all devices downstream from each sequential node up to a specified depth; and
comparing the combinatorial power metric value with a target power metric value to determine if power consumption by the portion of the electronic device meets a predetermined power performance goal.

2. The method of claim 1, further comprising repeatedly determining the combinatorial power metric value for the one or more sequential nodes over time to generate a plurality of combinatorial power metric values over time.

3. The method of claim 1, where the combinatorial power metric value is computed as a weighted average activity (WAA) metric for a standard cell portion of the design file.

4. The method of claim 3, where the WAA metric is computed by combining an effective switching capacitance for the standard cell portion of the design file, a switching activity measure for the standard cell portion of the design file, and a power effort measure for the standard cell portion of the design file.

5. The method of claim 4, where the WAA metric is computed as follows:

$$WAA = \sum_{k=0}^{N}(W_k * A_k) \Big/ \sum_{k=0}^{N}(W_k)$$

where k spans over all standard cell enables in the design file, N is the total number of unique enables in the design file, where $W_k$ is a weight that is computed as a function of the effective switching capacitance and switching activity measure for enable k, and where $A_k$ is an activity measure on enable k.

6. The method of claim 1, where the combinatorial power metric value is computed as a macro enable activity (MEA) metric for a macro block portion of the design file.

7. The method of claim 6, where the MEA metric is computed by combining an effective switching capacitance for the macro block portion of the design file, a switching activity measure for the macro block portion of the design file, and a power effort measure for the macro block portion of the design file.

8. The method of claim 7, where the MEA metric is computed as follows:

$$MEA = \sum_{k=0}^{N}(MW_k * A_k) \Big/ \sum_{k=0}^{N}(MW_k)$$

where k spans over all macro block enables in the design file, N is the total number of unique enables in the design file, where $MW_k$ is a macro weight that is computed as a function of the effective switching capacitance and switching activity measure for enable k, and where $A_k$ is the activity measure on enable k.

9. The method of claim 1, further comprising computing a design goal status value indicating what percentage of the target power metric value has been met by the combinatorial power metric value.

10. A non-transitory computer readable storage medium storing instructions operable to control operation of a data processor to:
access a design file representing an electronic device;
identify a plurality of sequential nodes for a specified circuit module in the design file where each of the plurality of sequential nodes gates a signal provided to a respective sequential device to enable or disable propagation of information through the sequential device;
compute and store a combinatorial power metric for the plurality of sequential nodes based upon an effective switching capacitance, a switching activity measure, and power effort measure associated with a first test bench power pattern; and
compare the combinatorial power metric with a target power metric value to determine if power consumption at the specified circuit module meets a predetermined power performance goal.

11. The computer readable storage medium of claim 10, wherein the executable instructions and data which cause the at least one processing device to compute and store the combinatorial power metric comprise executable instructions and data for computing a weighted average activity (WAA) metric for the plurality of sequential nodes for a specified standard cell type circuit module in the design file.

12. The computer readable storage medium of claim 10, wherein the executable instructions and data which cause the at least one processing device to compute and store the combinatorial power metric comprise executable instructions and data for computing a macro enable activity (MEA) metric for the plurality of sequential nodes for a specified macro block type circuit module in the design file.

13. The computer readable storage medium of claim 10, further comprising instructions to generate a report to track overall convergence of the combinatorial power metric to the target power metric value for the specified circuit module.

14. The computer readable storage medium of claim 10, further comprising instructions to select one of the plurality of sequential nodes in the specified circuit module based upon its combinatorial power metric, and to initiate a layout operation on the selected sequential node.

* * * * *